United States Patent [19]

Botkins

[11] Patent Number: 5,775,023
[45] Date of Patent: Jul. 7, 1998

[54] DEVICE FOR APPLYING A BAIT COMPOSITION TO A FISHING LURE

[76] Inventor: L. T. Botkins, P.O. Box 1663, Paragould, Ark. 72451

[21] Appl. No.: 827,096

[22] Filed: Mar. 17, 1997

[51] Int. Cl.⁶ ............................................. A01K 97/04
[52] U.S. Cl. ........................................................ 43/4
[58] Field of Search .................... 43/4; D7/691, D7/692; D10/46.2; 210/470, 471

[56] References Cited

U.S. PATENT DOCUMENTS

| | | | |
|---|---|---|---|
| D. 265,158 | 6/1982 | Green, II | D10/46.2 |
| D. 302,639 | 8/1989 | Charm | D7/691 |
| 1,406,581 | 2/1922 | Pick | 210/471 |
| 2,502,816 | 4/1950 | Bennek | 43/4 |
| 2,883,783 | 4/1959 | Del Matter | 43/4 |
| 2,982,045 | 5/1961 | Highland | 43/4 |
| 3,059,369 | 10/1962 | Swanson | 43/4 |
| 3,556,507 | 1/1971 | Haskell | 43/4 |
| 3,753,308 | 8/1973 | Swanson | 43/4 |
| 3,949,510 | 4/1976 | Johnson | 43/4 |
| 4,118,807 | 10/1978 | McCauley | 43/4 |
| 4,501,222 | 2/1985 | Stone | 118/234 |
| 4,771,564 | 9/1988 | Whitley | 43/4 |
| 5,170,582 | 12/1992 | Morgin et al. | 43/54.1 |
| 5,269,087 | 12/1993 | Johnston | 43/4 |
| 5,297,354 | 3/1994 | McGriff | 43/4 |
| 5,339,554 | 8/1994 | Lippens | 43/4 |
| 5,465,522 | 11/1995 | Varda | 43/4 |

*Primary Examiner*—Michael J. Carone
*Assistant Examiner*—Darren Ark
*Attorney, Agent, or Firm*—Norman B. Rainer

[57] ABSTRACT

A device for scooping a dippable bait composition and applying the composition uniformly to a fishing lure includes a rigid handle having an attached sleeve of monolithic construction. The sleeve has a downwardly convergent conical shape configured to hold the bait composition, and has a slot that travels about 180 degrees around the sleeve, thereby allowing insertion of a fishing line securing a lure which is then treated merely by pulling it through the sleeve.

9 Claims, 1 Drawing Sheet

DEVICE FOR APPLYING A BAIT COMPOSITION TO A FISHING LURE

BACKGROUND OF THE INVENTION

1. Field of the Invention

This invention relates to the art of fishing, and more particularly concerns a device which enables a fisherman to apply an attractant composition to a fishing lure.

2. Description of the Prior Art

In the art of fishing for catfish, it has generally been found that artificial lures equipped with fish hooks are reasonably effective for enticing the catfish to bite. Such lures are preferably fabricated of a rubbery material such as plasticized polyvinyl chloride, and usually have an elongated worm-like shape. However, it often occurs that catfish dwell in waters so muddy that the visual stimulus of the lure may be ineffective.

The application of attractant scents or baits to artificial fishing lures is well known. Such attractants better enable the fish to perceive the lure, and provide further enticement for the fish to bite the lure. Specialized compositions have been found to be particularly effective as attractant scents on baits for catfish. Such compositions, usually proprietary formulations of undisclosed constitution, often contain animal blood substances in a heterogenous liquid or semi-liquid viscous mixture of barely pourable nature. Preferable mixtures are often of paste-like consistency and possess an extremely strong odor. If inadvertently deposited onto the fisherman's hands, clothing, or equipment, the resultant odor is tenacious, long-lived and difficult to remove.

The application of a controlled amount of such attractant compositions to a catfish lure is difficult because of the non-flowing consistency of the compositions and the characteristics of the elongated rubbery lure having hooks.

It is accordingly an object of the present invention to provide a device for applying a dippable attractant composition to a fishing lure.

It is another object of this invention to provide a device as in the foregoing object for uniformly applying a controlled amount of said attractant composition to said fishing lure.

It is a further object of the present invention to provide a device of the aforesaid nature specially adapted to use with an elongated rubbery catfish lure.

It is still another object of this invention to provide a device of the aforesaid nature which is of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a bait handling device comprising:

a) a rigid handle elongated between proximal and distal extremities, and b) a sleeve of monolithic construction attached to said distal extremity, said sleeve having circular upper and lower extremities centered upon an axis orthogonal to the direction of elongation of said handle and having a downwardly convergent conical shape causing said lower extremity to be of smaller diameter than said upper extremity, and a slot running between said extremities in a path that travels about 180 degrees about said sleeve.

In preferred embodiments of the device, a zone of cylindrical contour is disposed in contiguous relationship with said lower extremity. An aperture may be provided in the handle adjacent said proximal extremity to permit the device to be hung for storage purposes when not in use, or to permit attachment of a lanyard. The entire device may be of monolithic construction, fabricated of plastic by way of a molding operation.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
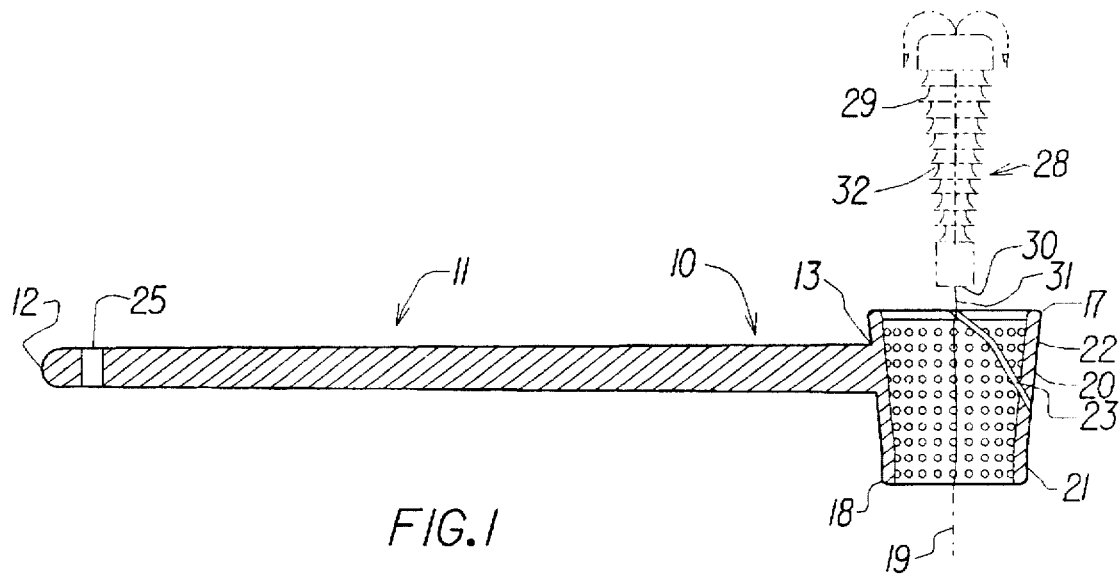
FIG. 1 is a sectional side view of an embodiment of the bait handling device of the present invention shown in functional relationship with a fishing lure.
Figure 2:
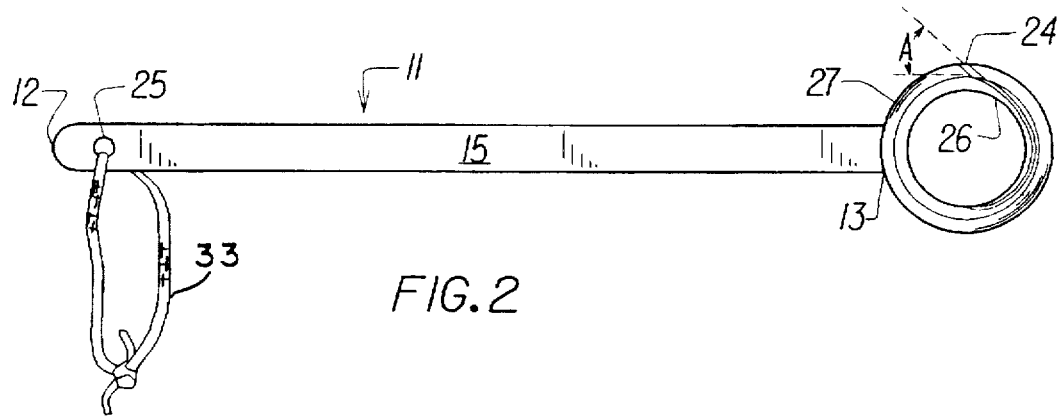
FIG. 2 is a top plan view of the device of FIG. 1.
Figure 3:
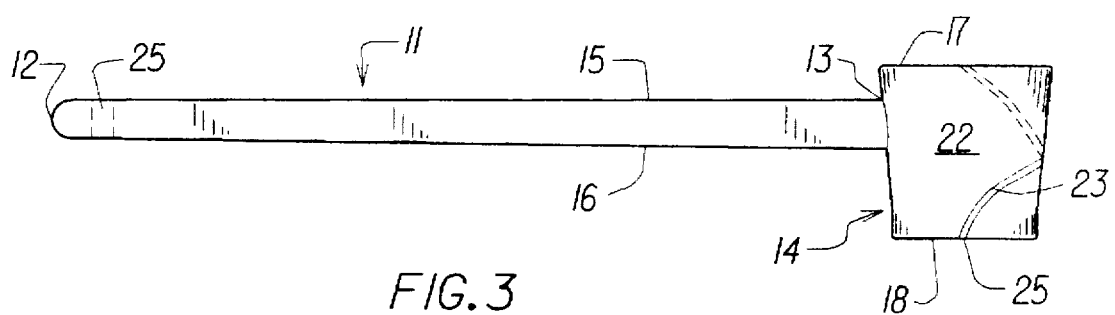
FIG. 3 is a side elevational view of the device of FIG. 1.

Referring now to FIGS. 1–3, an embodiment of the bait dipper device 10 of the present invention is shown comprised of rigid handle 11 elongated between proximal extremity 12 and distal extremity 13, and sleeve 14 attached to said distal extremity. The handle is of rigid construction, fabricated of plastic, wood, metal or equivalent materials. The length of the handle, measured between said proximal and distal extremities is typically about six to nine inches. The handle may be of round, rectangular, or other cross-sectional configuration, and will have a thickness, measured between upper and lower surfaces 15 and 16, respectively, of about ½ inch. In some embodiments, the handle may have a tapered configuration wherein portions adjacent the proximal extremity are thinner than portions adjacent the distal extremity. Hanging means, in the form of aperture 25 is disposed in handle 11 adjacent said proximal extremity for storing the device when not in use. A lanyard 33 may be engaged by aperture 25, said lanyard being adapted to wrap around the user's hand to prevent overboard loss of the device.

Sleeve 14 is a hollow structure defined by monolithic sidewall 22, and bounded in part by circular upper and lower extremities 17 and 18, respectively, centered upon axis 19 which is orthogonal to the direction of elongation of handle 11. Sidewall 22 is bounded in part by interior and exterior surfaces 26 and 27, respectively. The upper portion 20 of sleeve 14 has a downwardly convergent conical shape. A lower portion 21 of the sleeve, contiguous with said upper portion and lower extremity 18, has a cylindrical shape. The inside diameter of upper extremity 17 is preferably in the range of 1.0 to 1.5 inches. The inside diameter of lower extremity 18 is preferably in the range of 0.5 to 1.0 inch. Sidewall 22, of plastic construction, preferably has a uniform thickness in the range of 0.1 to 0.2 inch. Interior surface 26 is preferably textured in a manner which facilitates retention of a viscous fluid.

A slot 23 is formed in sidewall 22, and runs between said upper and lower extremities in a spiral path that travels approximately 180 degrees about said sleeve. In particular, the site of confluence 24 of said slot with said upper extremity is displaced 180 degrees about axis 19 with respect to the site of confluence 25 of said slot with said lower extremity. In other embodiments slot 23 may travel around axis 19 in greater or lesser extent than the aforementioned embodiment involving 180 degrees of travel. The width of slot 23 may range from about 0.025 to 0.035 inch, and is preferably formed at an angle A of about 45 degrees with respect to said interior and exterior sidewalls, as best shown in FIG. 2. Angle A is such that, in going from said outer to inner surfaces, the slot is oriented in the same general direction as the spiral path of the slot about axis 19.

In use, sleeve 14 is dipped into a wide mouth container holding a suitable paste-like bait composition such as Doc's Soft Catfish Getter Bait, Catfish Charlie Blood Bait, or equivalent catfish baiting material. The device is then inverted so that the upper extremity of the sleeve is downwardly directed above the still open container. A rubbery lure 28 having a trailing extremity equipped with treble hooks 29, and a leading extremity 30 attached to fishing line 31 is positioned in front of said upper extremity. Line 31 is threaded through the slot and positioned upon axis 19. The lure is then drawn through the sleeve by pulling upon line 31. Such action causes the bait composition retained by textured interior surface 26 to be uniformly applied onto the surface of the lure. It is to be noted that lure 28 contains a scale-like textured zone 32 which serves to receive and retain the bait composition. A suitable specific lure is available as Doc's Super Catfish Worm. It is to be noted that the diameter of the lower extremity of the sleeve is just large enough to permit passage of the treble hook 29.

Sleeve 14 is preferably fabricated of plastic by way of a molding operation. Suitable plastics include thermoplastic molding resins such as polyolefin, nylon, polyester, ABS resin and polyacetals. The sleeve may be affixed to the handle by conventional fasteners, or may be integral therewith.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A device for scooping a dippable bait composition and applying said composition to a fishing lure, said device comprising:

a) a rigid handle elongated between proximal and distal extremities, and b) a hollow sleeve attached to said distal extremity, said sleeve comprised of a monolithic sidewall having circular upper and lower extremities centered upon an axis orthogonal to the direction of elongation of said handle and having a downwardly convergent conical shape causing said lower extremity to be of smaller diameter than said upper extremity, and a slot in said sidewall running between said upper and lower extremities in a spiral path that travels about 180 degrees about said sleeve with respect to said axis.

2. The device of claim 1 wherein a zone of cylindrical contour is disposed in contiguous relationship with said lower extremity as a continuous integral extension of said sleeve, the diameter of said cylindrical zone being the same as the diameter of said lower extremity.

3. The device of claim 1 wherein said handle contains an aperture adjacent said proximal extremity to permit the device to be hung for storage purposes when not in use and to permit attachment of a lanyard.

4. The device of claim 3 further provided with a lanyard attached to said aperture.

5. The device of claim 1 wherein the inside diameter of said upper extremity is between 1.0 and 1.5 inches, and the inside diameter of said lower extremity is between 0.5 and 1.0 inch.

6. The device of claim 5 wherein said sleeve is fabricated of a sidewall having inner and outer surfaces and a uniform thickness between said surfaces, said thickness being in the range of 0.1 to 0.3 inch.

7. The device of claim 6 wherein said inner surface is textured in a manner to facilitate retention of said bait composition.

8. The device of claim 7 wherein the width of said slot is between 0.025 and 0.035 inch.

9. The device of claim 6 wherein the slot is formed at an angle of about 45 degrees with respect to said inner and outer surfaces and oriented such that, in going from said outer surface to said inner surface, the slot is oriented in the same direction as the spiral path of the slot about said axis.

* * * * *